United States Patent
Lopez et al.

(10) Patent No.: US 10,120,732 B1
(45) Date of Patent: Nov. 6, 2018

(54) EXCLUSION MONITORS (71) Applicant: KnuEdge Incorporated, San Diego, CA (US)

(72) Inventors: Ricardo Jorge Lopez, San Marcos, CA (US); Robert N. Hilton, San Diego, CA (US)

(73) Assignee: FRIDAY HARBOR LLC, New York, NY (US)

( * ) Notice: Subject to any disclaimer, the term of this patent is extended or adjusted under 35 U.S.C. 154(b) by 5 days.

(21) Appl. No.: 15/499,796

(22) Filed: Apr. 27, 2017

(51) Int. Cl.
*G06F 3/06* (2006.01)
*G06F 9/52* (2006.01)
*G06F 17/30* (2006.01)
*G06F 15/78* (2006.01)

(52) U.S. Cl.
CPC ............. *G06F 9/526* (2013.01); *G06F 3/065* (2013.01); *G06F 3/0619* (2013.01); *G06F 3/0653* (2013.01); *G06F 15/7807* (2013.01); *G06F 17/30982* (2013.01)

(58) Field of Classification Search
CPC ...... G06F 3/0653; G06F 3/0619; G06F 3/065; G06F 3/0683; G06F 15/7807
See application file for complete search history.

(56) References Cited

U.S. PATENT DOCUMENTS

| 2007/0124728 A1* | 5/2007 | Rosenbluth | G06F 9/526 718/100 |
| 2010/0042771 A1* | 2/2010 | Kawaguchi | G06F 12/0808 711/5 |

* cited by examiner

*Primary Examiner* — Reginald G Bragdon
*Assistant Examiner* — Edward Wang
(74) *Attorney, Agent, or Firm* — Sheppard Mullin Richter & Hamtpon LLP; Daniel N. Yannuzzi (57) ABSTRACT

Systems, devices, and techniques for processor synchronization are described. A described system includes exclusion monitor circuitry, a content addressable memory (CAM) coupled with the exclusion monitor circuitry, and processors coupled with the exclusion monitor circuitry. The processors can perform synchronization via the exclusion monitor circuitry using an identifier tag. The exclusion monitor circuitry can utilize the CAM to store information for handling one or more named mutual exclusions. The exclusion monitor circuitry and the CAM can be configured to concurrently handle multiple identifier tags that correspond to different mutual exclusions.

10 Claims, 6 Drawing Sheets

EXCLUSION MONITORS

FIELD OF THE DISCLOSURE

The systems, methods, and apparatuses described herein relate to processor synchronization.

BACKGROUND

In some multiprocessor systems, processors can exchange data with each other to facilitate multiprocessor communication. The data exchange can be performed using a direct transport over a link layer. Additionally, the data exchange can be performed using a shared data memory region protected by an exclusion protocol such as a mutual exclusion semaphore, which can be referred to as a mutex. A mutex offers a mutual exclusion protocol which holds one or more processors in a stalled state, e.g., unable to proceed forward into an operation sequence often referred to as a critical section, until the processor which owns the mutex completes its critical section. The beginning and ending of a critical section are typically demarcated by a mutex acquisition sequence and a mutex release sequence respectively.

SUMMARY

Systems and techniques for processor synchronization are disclosed. In one aspect of the disclosed technologies, a system includes exclusion monitor circuitry, a content addressable memory (CAM) coupled with the exclusion monitor circuitry, and processors coupled with the exclusion monitor circuitry. The CAM can be configured to store CAM entries. A CAM entry can include a CAM tag and a release register. The processors can perform synchronization via the exclusion monitor circuitry using an identifier tag. A first processor of the processors can be configured to send a release request to the exclusion monitor circuitry, the release request including the identifier tag. The exclusion monitor circuitry can be configured to perform a first lookup in the CAM based on the identifier tag of the release request. The exclusion monitor circuitry can be configured to, based on the first lookup missing in the CAM, write the identifier tag of the release request as the CAM tag in the CAM entry, mark the CAM entry as valid, write a processor identifier of the first processor in the release register of the CAM entry, and cause the first processor to enter a stalled state. A second processor of the processors can be configured to send an acquire request to the exclusion monitor circuitry, the acquire request including the identifier tag. The exclusion monitor circuitry can be configured to perform a second lookup in the CAM based on the identifier tag of the acquire request, and based on the second lookup hitting in the CAM, issue a grant to the second processor and release the first processor from the stalled state by using the processor identifier stored in the release register of the CAM entry.

These and other implementations can include one or more of the following features. The exclusion monitor circuitry can be configured to release the first processor from the stalled state by sending a retry command to the first processor. In some implementations, the first processor sends an additional release request including the identifier tag in response to the retry command that causes the exclusion monitor circuitry to invalidate the CAM entry. In some implementations, the stalled state causes the first processor to sleep such that a program counter associated with the second processor does not advance. The exclusion monitor circuitry can be configured to cause the second processor to enter the stalled state based on the second processor sending an additional acquire request including the identifier tag and the identifier tag of the additional acquire request matching the CAM tag in the CAM entry. In some implementations, the first processor sends an additional release request including the identifier tag, the additional release request causing the exclusion monitor circuitry to release the second processor from the stalled state.

In another aspect, a technique can include operating a first processor to repeatedly send a release request to exclusion monitor circuitry and operating a second processor to repeatedly send an acquire request to the exclusion monitor circuitry, where the first and second processors perform synchronization via the exclusion monitor circuitry using an identifier tag, the release request and the acquire request each including the identifier tag. The technique can include performing, by the exclusion monitor circuitry, a first lookup in a CAM based on the identifier tag of the release request; operating the exclusion monitor circuitry, based on the first lookup missing in the CAM, to write the identifier tag of the release request as a CAM tag in a CAM entry of the CAM, mark the CAM entry as valid, write a processor identifier of the first processor in a release register of the CAM entry, and cause the first processor to enter a stalled state; performing, by the exclusion monitor circuitry, a second lookup in the CAM based on the identifier tag of the acquire request; and operating the exclusion monitor circuitry, based on the second lookup hitting in the CAM, to issue a grant to the second processor, and release the first processor from the stalled state by using the processor identifier stored in the release register of the CAM entry.

These and other implementations can include one or more of the following features. Operating the exclusion monitor circuitry to release the first processor from the stalled state can include sending a retry command to the first processor. Implementations can include operating the first processor to send an additional release request including the identifier tag in response to the retry command that causes the exclusion monitor circuitry to invalidate the CAM entry. The stalled state can cause the first processor to sleep such that a program counter associated with the second processor does not advance. Implementations can include operating the second processor to send an additional acquire request including the identifier tag, and operating the exclusion monitor circuitry to cause the second processor to enter the stalled state based on a receipt of the additional acquire request and the identifier tag of the additional acquire request matching the CAM tag in the CAM entry. Implementations can include operating the first processor to send an additional release request including the identifier tag; and operating the exclusion monitor circuitry to release the second processor from the stalled state in response to a receipt of the additional release request.

In yet another aspect, a system can include exclusion monitor circuitry, a CAM coupled with the exclusion monitor circuitry, and processors coupled with the exclusion monitor circuitry, where the processors perform mutual exclusion via the exclusion monitor circuitry using an identifier tag. The CAM can be configured to store CAM entries, where a CAM entry of the CAM entries can include a CAM tag and an acquire register. A first processor of the processors can be configured to send a first acquire request to the exclusion monitor circuitry, the first acquire request including the identifier tag. The exclusion monitor circuitry can be configured to perform a first lookup in the CAM based on the identifier tag of the first acquire request. The exclusion monitor circuitry can be configured to, based on the first lookup missing in the CAM, write the identifier tag as the CAM tag in the CAM entry, mark the CAM entry as valid, and issue a grant to the first processor. A second processor of the processors can be configured to send a second acquire request to the exclusion monitor circuitry, the second acquire request including the identifier tag. The exclusion monitor circuitry can be configured to perform a second lookup in the CAM based on the identifier tag of the second acquire request. The exclusion monitor circuitry can be configured to, based on the second lookup hitting in the CAM, write a processor identifier of the second processor in the acquire register of the CAM entry, and cause the second processor to enter a stalled state.

These and other implementations can include one or more of the following features. The first processor can be configured to send a release request to the exclusion monitor circuitry, the release request including the identifier tag. In some implementations, the exclusion monitor circuitry performs a third lookup in the CAM based on the identifier tag of the release request. The exclusion monitor circuitry can be configured to, based on the third lookup hitting in the CAM, release the second processor from the stalled state by using the processor identifier stored in the acquire register of the CAM entry. The exclusion monitor circuitry can be configured to release the second processor from the stalled state by sending a retry command that is addressed based on the processor identifier stored in the acquire register of the CAM entry. In some implementations, the stalled state causes the second processor to sleep such that a program counter associated with the second processor does not advance. In some implementations, the acquire register stores a plurality of processor identifiers that correspond to different ones of the processors. In some implementations, the exclusion monitor circuitry, the CAM, and the processors are formed within a system-on-a-chip. Implementations can include a plurality of exclusion monitor circuitries, where the first acquire request and the second acquire request identify a particular one of the exclusion monitor circuitries.

In another aspect, a technique can include sending, from a first processor, a first acquire request to exclusion monitor circuitry, the first acquire request including an identifier tag; performing, by the exclusion monitor circuitry, a first lookup in a CAM based on the identifier tag of the first acquire request; creating, in the CAM by the exclusion monitor circuitry, a CAM entry based on the first lookup missing in the CAM; sending, from a second processor, a second acquire request to the exclusion monitor circuitry, the second acquire request including the identifier tag; performing, by the exclusion monitor circuitry, a second lookup in the CAM based on the identifier tag of the second acquire request; writing a processor identifier of the second processor in an acquire register of the CAM entry based on the second lookup hitting in the CAM; and causing the second processor to enter a stalled state based on the second lookup hitting in the CAM. Creating the CAM entry can include writing the identifier tag of the first acquire request as a CAM tag in the CAM entry and marking the CAM entry as valid.

These and other implementations can include one or more of the following features. Implementations can include sending, from the first processor, a release request to the exclusion monitor circuitry, the release request including the identifier tag; performing, by the exclusion monitor circuitry, a third lookup in the CAM based on the identifier tag of the release request; and releasing the second processor from the stalled state based on the third lookup hitting in the CAM. Releasing the second processor can include sending a retry command that is addressed based on the processor identifier stored in the acquire register of the CAM entry. In some implementations, the stalled state causes the second processor to sleep such that a program counter associated with the second processor does not advance.

Particular aspects of the disclosed technologies can be implemented so as to realize one or more of the following potential advantages. A described technology can increase the speed and flexibility of hardware implemented synchronization techniques. A described technology can enable multiple exclusion tags to be in use at any given time.

Details of one or more implementations of the disclosed technologies are set forth in the accompanying drawings and the description below. Other features, aspects, descriptions and potential advantages will become apparent from the description, the drawings, and the claims.

DETAILED DESCRIPTION

Many current computing systems utilize fixed hardware locks to implement the mutual exclusion protocol. It may be difficult to anticipate the number of concurrent parallel mutex locks that may be employed by a parallel algorithm or a highly concurrent distributed processing application. Often the chosen count is constraining and debilitates the application in attaining its potential benefits. Existing hardware implementations typically stop at the base support of a mutual exclusion protocol, yet the inversion of the protocol can offer an opportunity to leverage existing mechanism to effect a gateway type of processor synchronization.

A computing system, as described herein, provides a content addressable memory (CAM) based hardware exclusion protocol with the capability of inversion. An exclusion monitor, within the system, provides support for a mutual exclusion protocol and provide a configurable number of locks allowing applications to efficiently scale in highly distributed environments. The exclusion monitor utilizes a CAM for naming mutexes. For example, a CAM can store multiple entries at any given time that correspond to different named mutexes in use within the system. The exclusion monitor supports the base exclusion protocol of lock mutex and unlock mutex, whereby the requesting processor can only proceed once the named mutex is available. All other requesting processors for that particularly named mutex are blocked until the holding processor releases the lock.

Additionally, the exclusion monitor provides an inversion of the mutual exclusion protocol affording an additional capability utilizing the same hardware called a gateway protocol. The gateway protocol enables a controlled access gate which allows one and only one agent, e.g., processor, to pass through at a time for a given named mutex. The inversion of the exclusion protocol occurs when a gatekeeper processor takes a lock it does not intend to use. A passing processor releases a lock it does not have. The passing processor can only proceed if the named lock has already been taken by the gatekeeper processor. This effects a gateway controlled by the gatekeeper. Utilizing the exclusion monitor in this fashion can also synchronize the gatekeeper with prospective passing processors as well as it cannot again take the lock (e.g., open the gate) until it has been released by a passing processor (effectively closing the gate).

Figure 1:
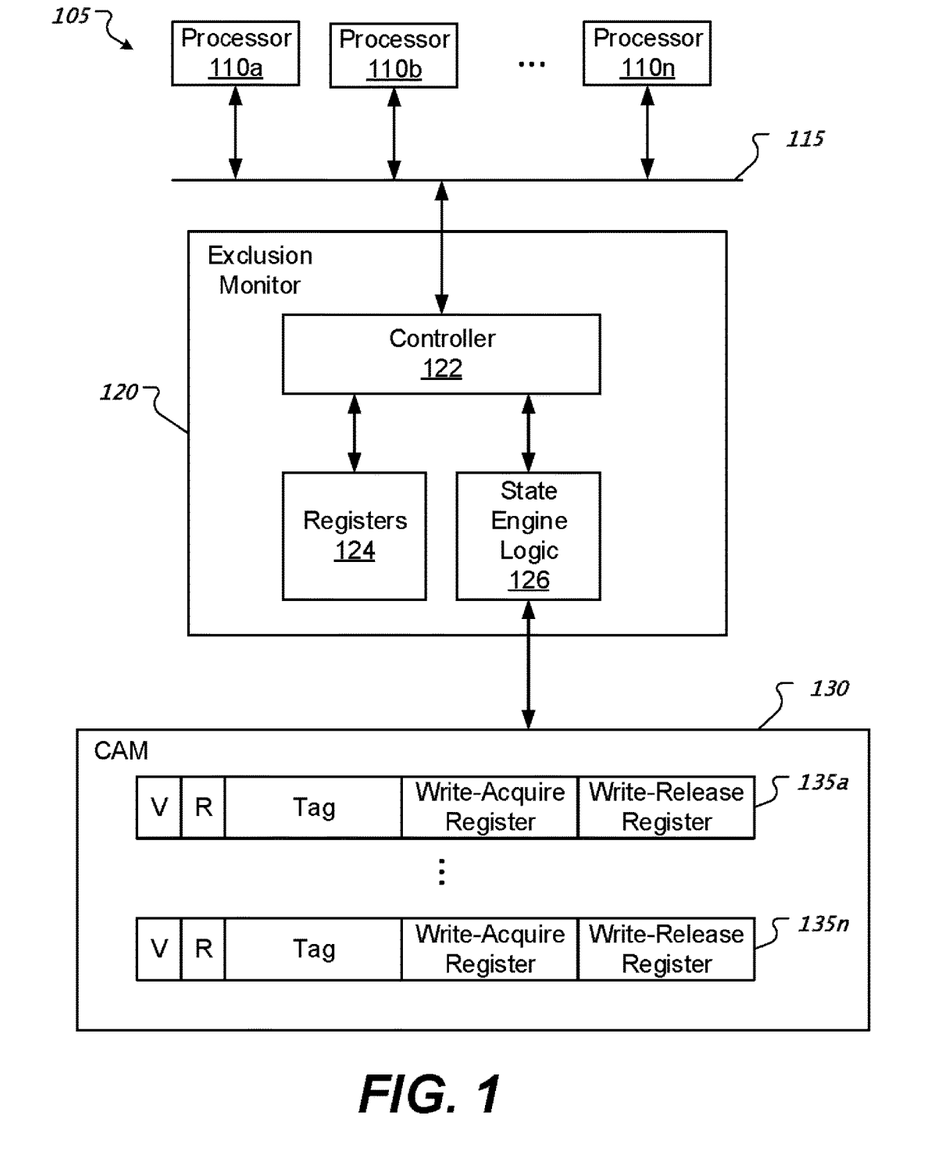
FIG. 1 shows an architecture of an example of a computing system that includes an exclusion monitor.

FIG. 1 shows an architecture of an example of a computing system 105 that includes an exclusion monitor 120. The computing system 105 includes multiple processors 110a-n. The processors 110a-n can be referred to as cores or processing engines. The processors 110a-n are coupled with circuitry called an exclusion monitor 120 via a network 115. In some implementations, the network 115 includes a bus. An application executing on the computing system 105 can employee one or more differently named mutexes to synchronize one or more groups of tasks. The application can use an exclusion tag to refer to a specific mutex. A tag can be a predetermined binary value. The processors 110a-n can execute exclusion instructions including an acquire instruction and a release instruction to perform mutex based synchronization. Based on an execution of an acquire or a release instruction, a corresponding acquire or release request is transmitted to the exclusion monitor 120. The instructions and the requests can include an identifier tag referred to as an exclusion tag.

The exclusion monitor 120, in some implementations, is an addressable hardware component of the system 105 that utilizes one or more control sequences to manage exclusion tags within the CAM 130. The exclusion monitor 120 is capable of managing multiple exclusion tags at any given time. The exclusion monitor 120 can include a controller 122, registers 124, and state engine logic 126. The controller 122 can communicate with the processors 110a-n via network 115. In some implementations, the controller 122 uses a packet-based protocol to communicate with the processors 110a-n.

Based on receiving an acquire or release request via controller 122, the state engine logic 126 can perform a lookup in the CAM 130 using a tag in the request. Further, the state engine logic 126 can create, modify, or invalidate an entry 135a-n within the CAM 130 based on the request. In some implementations, the state engine logic 126 can include a state engine for each initiator of a named mutex. A monitor initiator can be a processor 110a-n or a proxy. A proxy can represent a group of processors or a group of subordinate proxies. The registers 124 can store information to manage initiator signaling. For example, the registers 124 can store information to manage scenarios where the CAM 130 is full and a new named mutex cannot be created; such information can be used to notify the initiator when space becomes available within the CAM 130. In some implementations, the state engine logic 126 includes digital circuitry such as logic gates, e.g., AND gate, OR gate, or exclusive OR (XOR) gates, arranged to perform one or more operations as described herein. In some implementations, the exclusion monitor 120 includes the CAM 130.

The CAM 130 is arranged to store CAM entries 135a-n. The depth of the CAM 130, e.g., the number of CAM entries, is the maximum number of differently named mutexes that can be stored by the CAM 130. In this example, each CAM entry 135a-n includes a valid flag (labelled V), a release flag (labelled R), and a tag. Upon creation, the valid flag is set to indicate that the corresponding entry 135a-n is valid. As used herein, the notation V==T indicates that a CAM entry is valid, whereas V==F indicates that the CAM entry is not valid. The release flag, when asserted, indicates that the corresponding CAM entry was added by a release request in anticipation of a future acquire request with the same exclusion tag. The notation R==T indicates that the release flag of the CAM entry is TRUE, e.g., asserted, whereas R==F indicates that the release flag is FALSE, e.g., not asserted. In some implementations, the state engine logic 126 can perform a lookup responsive to an acquire or release request by searching each CAM entry 135a-n until a tag of an entry that matches the request's tag is located.

Further, in this example, each CAM entry 135a-n includes waiting registers: an acquire register and a release register. The acquire register can indicate if a specific processor 110a-n is waiting to acquire a tag associated with an entry already created in the CAM. The release register can indicate if a specific processor 110a-n is waiting to release a tag. Each register can store one or more processor identifiers. For example, a register can include a bit map where different bit positions within the bit map correspond to different ones of the processors 110a-n, e.g., if the n-th bit position is set to one, then the n-th processor of the processors 110a-n is waiting.

Upon execution of an exclusion instruction by a processor 110a-n, a corresponding request is sent to the exclusion monitor 120. Transmission of an acquire request to the exclusion monitor 120 causes a lookup of the request's identifier tag in the CAM 130. The lookup can result in either a miss (e.g., no matching tag in the CAM 130) or a hit (e.g., there is a matching tag in the CAM 130). A miss causes the request's identifier tag to be added to the CAM 130 and a grant response to flow back to the initiating processor 110a-n. A hit (where R==T due to a release request arriving before the acquire request) causes the matching CAM entry 135a-n data tag to be modified such that R==F, a grant to flow back to the initiating processor 110a-n, and a retry to flow back to any processors identified in the associated release register of the CAM entry 135a-n.

Transmission of a release request to the exclusion monitor 120 causes a lookup of the request's identifier tag in the CAM 130. A miss causes a CAM entry 135a-n to be created within the CAM 130 where the request's identifier tag is used as the tag of the CAM entry 135a-n and the R flag is asserted such that R==T. The miss can cause a reject to flow back to the initiating processor 110a-n. The initiating processor 110a-n can be enabled for CAM release change signaling from the exclusion monitor 120 by adding the processor's corresponding identifier to the release register for that tag within the CAM 130.

In some implementations, the processors 110a-n, exclusion monitor 120, and CAM 130 are formed within a system-on-a-chip (SoC). In some implementations, the computing system 105 includes multiple exclusion monitors. In some implementations, the processors 110a-n are arranged in two or more clusters, where each cluster includes an exclusion monitor. Details about clusters, among other things, are provided in U.S. patent application Ser. No. 15/157,982, filed May 18, 2016, and entitled "CONTENT ADDRESSABLE MEMORY (CAM) IMPLEMENTED TUPLE SPACES," which is incorporated herein by reference in its entirety.

Figure 2:
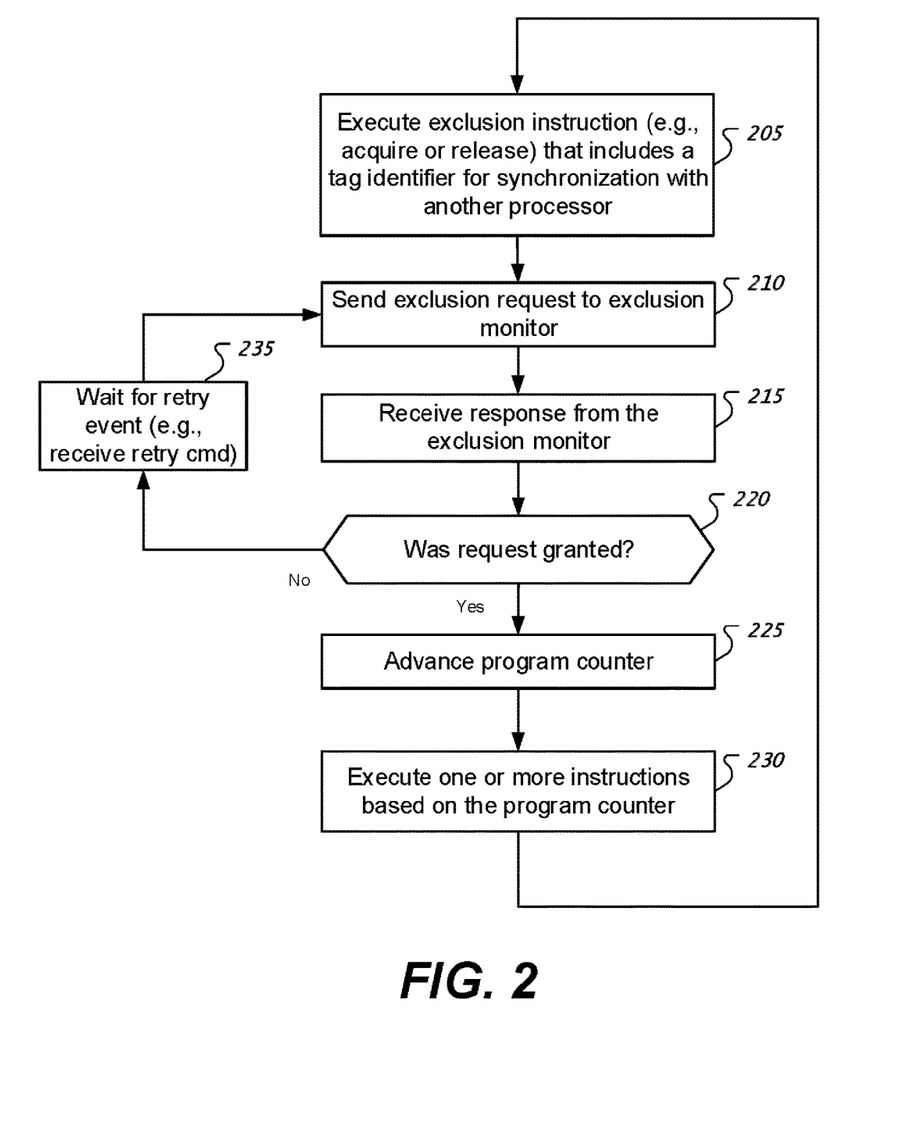
FIG. 2 shows a flowchart of an example of a processor process that is associated with executing a release or acquire instruction.

FIG. 2 shows a flowchart of an example of a processor process that is associated with executing a release or acquire instruction. A processor, e.g., processor 110a-n of FIG. 1, can execute a group of instructions, the instructions can include one or more exclusion instructions. At 205, the processor executes an exclusion instruction (e.g., acquire or release) that includes a tag identifier for synchronization with another processor. In some implementations, a computing system includes multiple separately addressable exclusion monitors, and an exclusion instruction includes an address corresponding to a specific exclusion monitor within the system. In some implementations, the tag is a binary value that is predetermined.

At 210, the processor sends an exclusion request to an exclusion monitor based on the exclusion instruction. Sending an exclusion request can include transmitting a packet to an exclusion monitor via a network. The exclusion monitor, in some implementations, can perform operations depicted by FIG. 3 if the request is a release request. The exclusion monitor, in some implementations, can perform operations depicted by FIG. 4 if the request is an acquire request.

At 215, the processor receives a response from the exclusion monitor. The response can include a status flag indicating whether the request was granted or rejected. At 220, the processor determines whether the request was granted. If the request was not granted, the processor waits for a retry event at 235. For example, the processor can wait to receive a retry command from the exclusion monitor. In some implementations, the processor is in a low power state while waiting for the retry command. Responsive to the retry event, the processor sends another exclusion request at 210. Otherwise, if the request was granted at 220, the processor advances the program counter at 225. At 230, the processor executes one or more instructions based on the program counter. As depicted, the processor can execute another exclusion request instruction at 205. In some implementations, the processor can exit the loop based on one or more exit criteria, e.g., after a predetermined number of iterations, failure event, etc.

Figure 3:
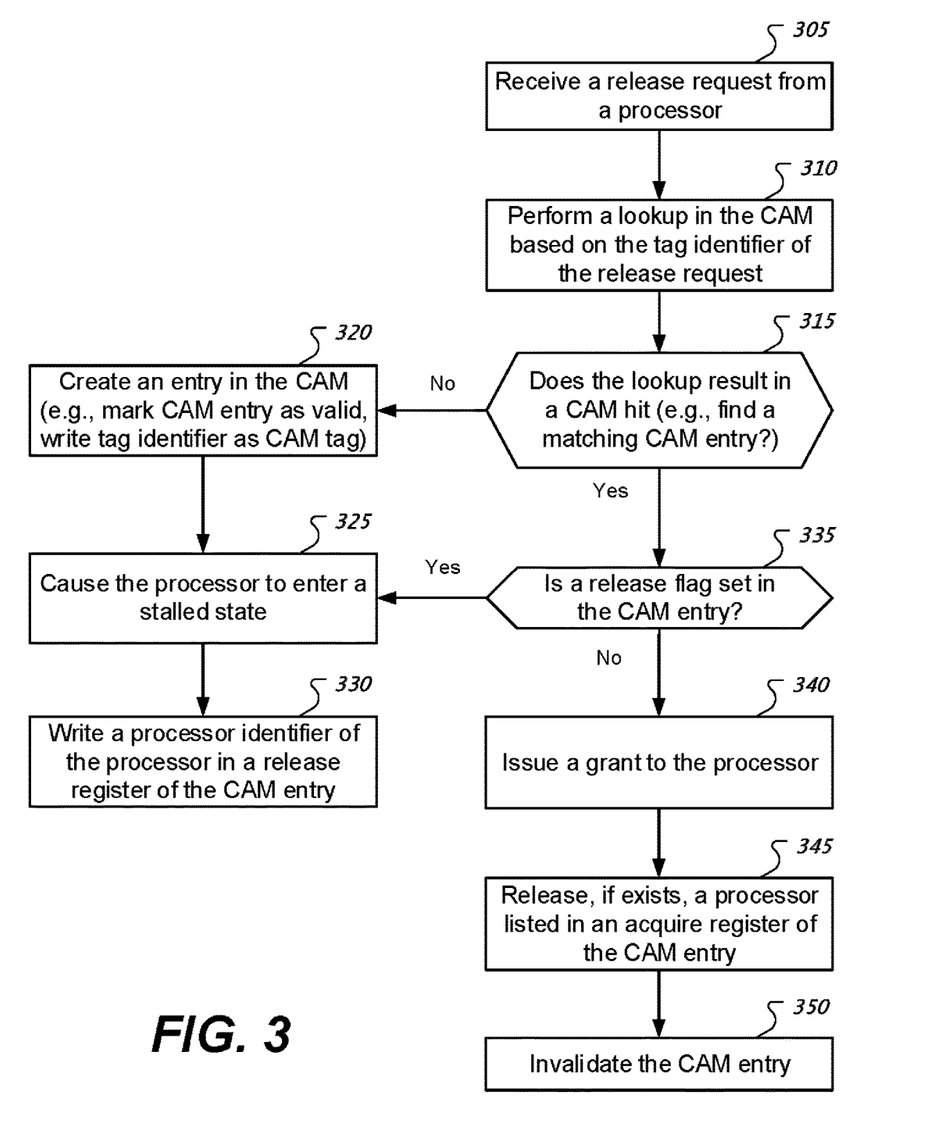
FIG. 3 shows a flowchart of an example of an exclusion monitor process that is associated with receiving a release request.

FIG. 3 shows a flowchart of an example of an exclusion monitor process that is associated with receiving a release request. At 305, the exclusion monitor receives a release request from a processor. At 310, the exclusion monitor performs a lookup in the CAM based on the tag identifier of the release request. In some implementations, the lookup is performed sequentially until a matching entry is found. In some implementations, the lookup is performed in parallel, e.g., all CAM entries are compared to the request's tag at the same time. At 315, the exclusion monitor determines if the lookup resulted in a CAM hit. In some implementations, a CAM is configured to compare the tag identifier with one or more CAM entries until a matching CAM entry is found. In some implementations, the CAM is configured to return an index number corresponding to the matching CAM entry or return an error status if a matching entry is not found.

If the lookup did not result in a CAM hit, e.g., resulted in a CAM miss, then the exclusion monitor creates an entry in the CAM at 320. Creating a CAM entry can include retrieving an index number corresponding to an available, e.g., invalid, entry in the CAM, writing the tag identifier as the CAM tag in the CAM entry, and marking the CAM entry as valid. Since a release request was responsible for creating the CAM entry, the exclusion monitor can mark the CAM entry as a release entry, e.g., setting the entry's release flag to TRUE. At 325, the exclusion monitor causes the processor to enter a stalled state. Causing the processor to enter a stalled state can include sending a reject command to the processor. In some implementations, a stalled state causes the processor to sleep such that a program counter associated with the processor does not advance. At 330, the exclusion monitor writes a processor identifier of the processor in a release register of the CAM entry. Writing a processor identifier of the processor can include setting a bit within the register at a particular bit position corresponding to the specific processor.

Otherwise, if the exclusion monitor determines that the lookup resulted in a CAM hit at 315, then the monitor determines whether the release flag is set to TRUE in the CAM entry at 335. If the release flag is set, then the exclusion monitor continues at 325 which is described above. If the release flag is not set (but there is still a valid entry), the exclusion monitor, at 340, issues a grant to the processor. At 345, the exclusion monitor releases, if exists, a processor listed in an acquire register of the CAM entry. Releasing a processor can include sending a retry command. The retry command can be addressed based on the processor identifier stored in the acquire register of the CAM entry. At 350, the exclusion monitor invalidates the CAM entry. Invalidating the CAM entry can include setting the entry's valid flag to FALSE.

Figure 4:
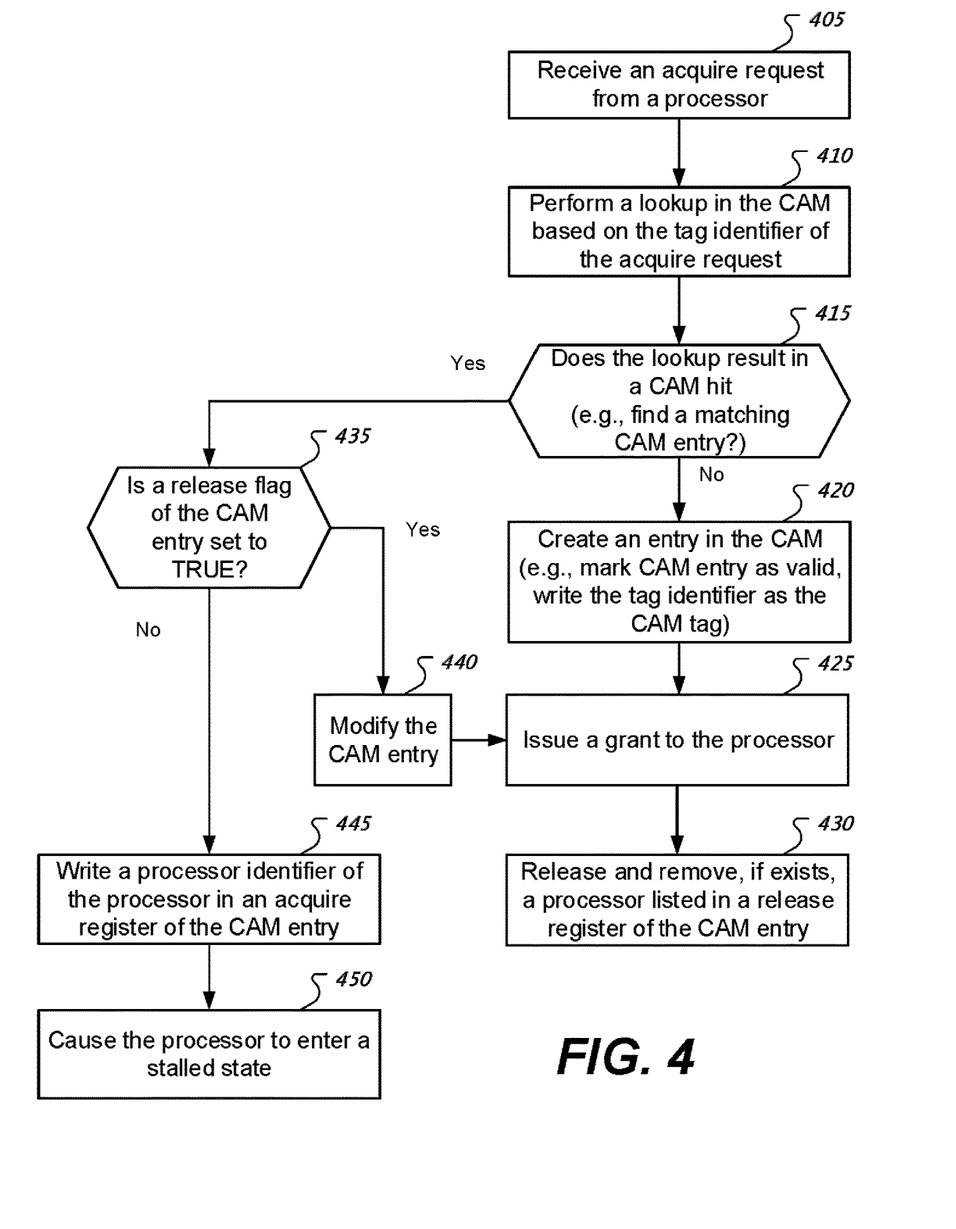
FIG. 4 shows a flowchart of an example of an exclusion monitor process that is associated with receiving an acquire request.

FIG. 4 shows a flowchart of an example of an exclusion monitor process that is associated with receiving an acquire request. At 405, the exclusion monitor receives an acquire request from a processor. At 410, the exclusion monitor performs a lookup in the CAM based on the tag identifier of the acquire request. At 415, the exclusion monitor determines if the lookup resulted in a CAM hit. In some implementations, a CAM is configured to compare the tag identifier with one or more CAM entries until a matching CAM entry is found. In some implementations, the CAM is configured to return an index number corresponding to the matching CAM entry or return an error status if a matching entry is not found.

If the lookup did not result in a CAM hit, e.g., it is a CAM miss, then the exclusion monitor creates an entry in the CAM at 420. Creating an entry can include retrieving an index number corresponding to an available, e.g., invalid, entry in the CAM, writing the tag identifier of the acquire request as the CAM tag in the CAM entry, and marking the CAM entry as valid. At 425, the exclusion monitor issues a grant to the processor. At 430, the exclusion monitor releases and removes, if exists, a processor listed in a release register of the CAM entry. Releasing a processor can include sending a retry command. The retry command can be addressed based on the processor identifier stored in the release register of the CAM entry.

If, at 415, the exclusion monitor determined that the lookup resulted in a CAM hit, the exclusion monitor determines whether a release flag of the CAM entry is set to TRUE. If the release flag is set to TRUE, then the exclusion monitor modifies the CAM entry at 440 and continues to perform steps 425 and 430 as described above. Modifying the CAM entry can include setting the release flag to FALSE. Otherwise, if the release flag is not set to TRUE, then the exclusion monitor writes a processor identifier of the processor in an acquire register of the CAM entry at 445 and causes the processor to enter a stalled state at 450.

Figure 5:
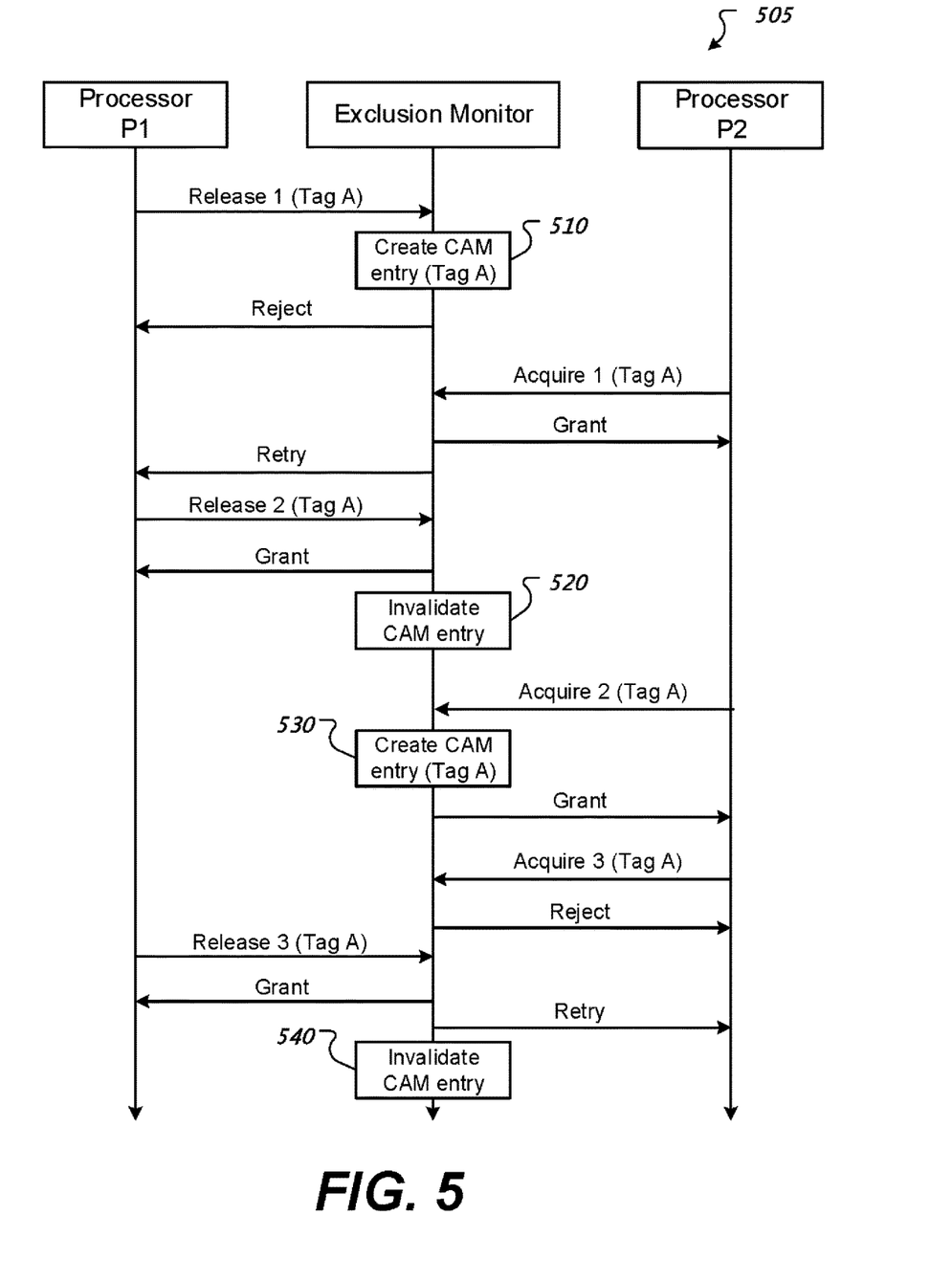
FIG. 5 shows a sequence of an example exchange of communications among processors and an exclusion monitor within a computing system.

FIG. 5 shows a sequence 505 of an example exchange of communications among processors and an exclusion monitor within a computing system. In this example, two processors (labelled P1 and P2 respectively) require synchronization. For example, processor P1 may be a "consumer" of data, whereas processor P2 is a "producer" of data. Processor P1 uses the release request for its part of the synchronization, whereas processor P2 uses the acquire request for its part of the synchronization. However, both processors include the same tag (Tag A) in their respective requests.

In the sequence 505, processor P1 sends a release request (#1) referencing tag A to the exclusion monitor. The exclusion monitor performs a lookup in its CAM based on tag A. Based on the lookup failing (e.g., all entries are initially invalid), the exclusion monitor creates an entry with tag A in the CAM (510). Since a corresponding acquire request has not been received, the exclusion monitor sends a reject response to processor P1. The reject response can cause processor P1 to stall. Further, the exclusion monitor can make a record in the CAM entry's release register denoting the identity of processor P1 to facilitate a retry.

Processor P2 sends an acquire request (#1) that identifies tag A to the exclusion monitor. Since the CAM entry with tag A has already been created, the lookup performed by the exclusion monitor responsive to the acquire request (#1) will be successful. The exclusion monitor sends a grant response to processor P2. In addition, the exclusion monitor sends a retry command to processor P1 due to its identity being stored in the CAM entry's release register. Based on receiving the retry command, processor P1 sends another release request (#2) referencing tag A to the exclusion monitor. Since the acquire request (#1) has been processed and the CAM entry updated, the exclusion monitor sends a grant command to processor P1 in response to the release request (#2). Since the requests from both processors have been satisfied, the exclusion monitor invalidates the CAM entry with tag A (520).

Later, processor P2 sends another acquire request (#2) that identifies tag A to the exclusion monitor. After creating the CAM entry with tag A again (530), the exclusion monitor sends a grant command to processor P2. In this portion of the sequence 505, processor P2 is faster than processor P1 and sends yet another acquire request (#3) before processor P1 has had a chance to send a matching release request. Here, the exclusion monitor sends a reject response to processor P2 and records the identity of P2 within an acquire register of the CAM entry. Processor P1 sends a release request (#3) referencing tag A to the exclusion monitor. Since the acquire request #2 has been processed and the CAM entry updated, the exclusion monitor sends a grant command to processor P1. Using the identity of P2 within the acquire register, the exclusion monitor sends a retry command to processor P2. The exclusion monitor invalidates the CAM entry (540). However, the CAM entry will be re-created when processor P2 responds to the retry (not shown).

Figure 6:
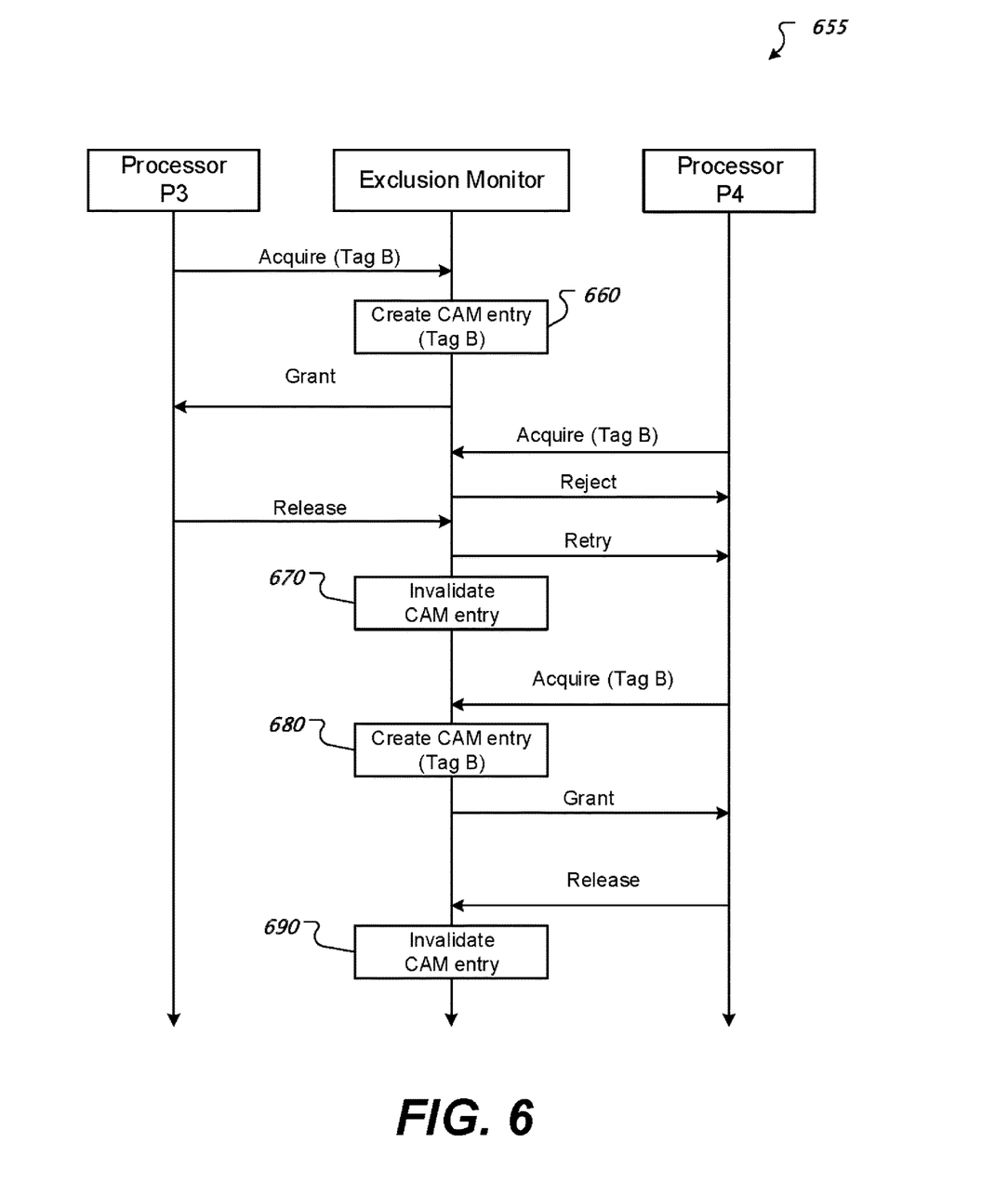
FIG. 6 shows a sequence of another example exchange of communications among processors and an exclusion monitor within a computing system.

FIG. 6 shows a sequence 655 of another example exchange of communications among processors and an exclusion monitor within a computing system. In this example, two processors (labelled P3 and P4 respectively) require synchronization. For example, both processors P3 and P4 may need to increment the same variable in memory. To avoid corruption, each processor acquires a specially named mutex (labelled as tag B) via the exclusion monitor, perform one or more operations, and releases the mutex.

In the sequence 655, processor P3 sends an acquire request referencing tag B to the exclusion monitor. The exclusion monitor performs a lookup in its CAM based on tag B. Based on the lookup failing (e.g., all entries are initially invalid), the exclusion monitor creates an entry with tag B in the CAM (660). The exclusion monitor sends a grant response to processor P3.

Processor P4 sends an acquire request referencing tag B to the exclusion monitor. A CAM entry with tag B has already been created via the previous acquire request from P3, thus the lookup performed by the exclusion monitor responsive to the acquire request from P4 will be successful. Since a release request has not been received, the exclusion monitor sends a reject response to processor P4. The reject response can cause processor P4 to stall. Further, the exclusion monitor can make a record in the CAM entry's acquire register denoting the identity of processor P4 to facilitate a retry.

Later, processor P3 sends a release request referencing tag B to the exclusion monitor. Since a CAM entry with tag B has already been created, the lookup performed by the exclusion monitor responsive to the release request will be successful. In some implementations, the exclusion monitor can send a grant request back to processor P3. In addition, the exclusion monitor sends a retry command to processor P4 due to its processor identifier being stored in the CAM entry's acquire register. Further, the exclusion monitor invalidates the CAM entry (670).

Responsive to the retry command, processor P4 sends another acquire request to the exclusion monitor. The exclusion monitor performs a lookup in its CAM based on tag B. Based on the lookup failing (e.g., the previous CAM entry with tag B was invalidated at 670), the exclusion monitor creates an entry with tag B in the CAM (680). The exclusion monitor sends a grant command to processor P4. Later, processor P4 sends a release request referencing tag B to the exclusion monitor. In response, the exclusion monitor invalidates the CAM entry (690).

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. An apparatus comprising:
    exclusion monitor circuitry;
    a content addressable memory (CAM) coupled with the exclusion monitor circuitry, wherein the CAM is configured to store CAM entries, wherein a CAM entry of the CAM entries comprises a CAM tag and a release register; and
    processors coupled with the exclusion monitor circuitry, wherein the processors perform synchronization via the exclusion monitor circuitry using an identifier tag,
    wherein a first processor of the processors is configured to send a release request to the exclusion monitor circuitry, the release request comprising the identifier tag,
    wherein, in response to receiving the release request, the exclusion monitor circuitry is configured to perform a first lookup in the CAM based on the identifier tag of the release request,
    wherein the exclusion monitor circuitry is configured to, based on the first lookup missing in the CAM, write the identifier tag of the release request as the CAM tag in the CAM entry, mark the CAM entry as valid, write a processor identifier of the first processor in the release register of the CAM entry, and cause the first processor to enter a stalled state,
    wherein a second processor of the processors is configured to send an acquire request to the exclusion monitor circuitry, the acquire request comprising the identifier tag,
    wherein, in response to receiving the acquire request, the exclusion monitor circuitry is configured to perform a second lookup in the CAM based on the identifier tag of the acquire request, and
    wherein the exclusion monitor circuitry is configured to, based on the second lookup hitting in the CAM, issue a grant to the second processor and release the first processor from the stalled state using the processor identifier stored in the release register of the CAM entry.

2. The apparatus of claim 1, wherein the exclusion monitor circuitry is configured to release the first processor from the stalled state by sending a retry command to the first processor, wherein the first processor sends an additional release request comprising the identifier tag in response to the retry command that causes the exclusion monitor circuitry to invalidate the CAM entry.

3. The apparatus of claim 1, wherein the stalled state causes the first processor to sleep such that a program counter associated with the second processor does not advance.

4. The apparatus of claim 1, wherein the exclusion monitor circuitry is configured to cause the second processor to enter the stalled state based on the i) second processor sending an additional acquire request comprising the identifier tag and ii) the identifier tag of the additional acquire request matching the CAM tag in the CAM entry.

5. The apparatus of claim 4, wherein the first processor sends an additional release request comprising the identifier tag, wherein the additional release request causes the exclusion monitor circuitry to release the second processor from the stalled state.

6. A method for performing synchronization between processors, comprising:
    sending, by a first processor, a release request to exclusion monitor circuitry, wherein the release request comprises an identifier tag;
    performing, by the exclusion monitor circuitry in response to receiving the release request, a first lookup in a content addressable memory (CAM) based on the identifier tag of the release request;
    operating the exclusion monitor circuitry, based on the first lookup missing in the CAM, to write the identifier tag of the release request as a CAM tag in a CAM entry of the CAM, mark the CAM entry as valid, write a processor identifier of the first processor in a release register of the CAM entry, and cause the first processor to enter a stalled state;
    sending, by a second processor, an acquire request to the exclusion monitor circuitry, wherein the acquire request comprises the identifier tag;
    performing, by the exclusion monitor circuitry, a second lookup in the CAM based on the identifier tag of the acquire request; and
    operating the exclusion monitor circuitry, based on the second lookup hitting in the CAM, to issue a grant to the second processor, and to release the first processor from the stalled state using the processor identifier stored in the release register of the CAM entry.

7. The method of claim 6, wherein operating the exclusion monitor circuitry to release the first processor from the stalled state comprises sending a retry command to the first processor, the method further comprising:
    operating the first processor to send an additional release request comprising the identifier tag in response to the retry command that causes the exclusion monitor circuitry to invalidate the CAM entry.

8. The method of claim 6, wherein the stalled state causes the first processor to sleep such that a program counter associated with the second processor does not advance.

9. The method of claim 6, comprising:
- operating the second processor to send an additional acquire request comprising the identifier tag; and
- operating the exclusion monitor circuitry to cause the second processor to enter the stalled state based on i) a receipt of the additional acquire request and ii) the identifier tag of the additional acquire request matching the CAM tag in the CAM entry.

10. The method of claim 9, comprising:
- operating the first processor to send an additional release request comprising the identifier tag; and
- operating the exclusion monitor circuitry to release the second processor from the stalled state in response to a receipt of the additional release request.

* * * * *